US008902395B2

(12) United States Patent
Jouin et al.

(10) Patent No.: US 8,902,395 B2
(45) Date of Patent: Dec. 2, 2014

(54) PACKAGE DEPENDENT SEGMENT TERMINAL REMAPPING FOR DRIVING LIQUID CRYSTAL DISPLAYS

(75) Inventors: Sebastien Jouin, Nantes (FR); Sylvan Garnier, Nantes (FR); Thierry Delalande, Nantes (FR)

(73) Assignee: Atmel Corporation, San Jose, CA (US)

( * ) Notice: Subject to any disclaimer, the term of this patent is extended or adjusted under 35 U.S.C. 154(b) by 126 days.

(21) Appl. No.: 13/617,125

(22) Filed: Sep. 14, 2012

(65) Prior Publication Data

US 2014/0078427 A1 Mar. 20, 2014

(51) Int. Cl.
*G02F 1/1345* (2006.01)

(52) U.S. Cl.
USPC .......................................... 349/151; 349/33

(58) Field of Classification Search
CPC ................ G09G 2310/027; G09G 2310/0297; G09G 2320/0204; G06F 3/038; G06F 3/14; G06F 9/3016; G06F 9/325; G02F 1/167; G02F 1/1313
USPC ........... 345/204, 214, 210, 100, 601, 99, 103, 345/93, 98; 349/33, 149, 150, 151, 152
See application file for complete search history.

(56) References Cited

U.S. PATENT DOCUMENTS

| | | | | |
|---|---|---|---|---|
| 6,188,241 B1 * | 2/2001 | Gauthier et al. | ................ | 326/41 |
| 6,898,096 B2 * | 5/2005 | Endo et al. | .................... | 363/147 |
| 8,091,001 B2 * | 1/2012 | Yao et al. | ...................... | 714/725 |
| 2012/0296623 A1 * | 11/2012 | Gray | ............................... | 703/15 |

OTHER PUBLICATIONS

Atmel Corporation, 8-bit AVR Microcontrollers, Application Note, "AVR065: LCD Driver for the STK502," 17 pages, (Jul. 2008).
Atmel Corporation, 8-bit AVR Microcontrollers, Application Note, "Atmel AVR1618: ATxmegaB ASCII Character Mapping," 17 pages (Nov. 2011).

* cited by examiner

*Primary Examiner* — Thoi Duong
(74) *Attorney, Agent, or Firm* — Fish & Richardson P.C.

(57) ABSTRACT

A microcontroller for controlling a liquid crystal display (LCD) is mountable in any one of multiple package types. The microcontroller includes a LCD controller to generate logical mapping signals indicative of voltages to be applied to segment terminals of a LCD glass. A driver circuit drives the segment terminals selectively. A remapping unit receives the logical mapping signals from the LCD controller and maps the logical mapping signals, for each of the package types, to physical segment terminal drivers in the driver circuit based on a distribution of I/O terminals that are bonded for each package type when that package type is used with the LCD glass.

23 Claims, 5 Drawing Sheets

| | | | | | | | | |
|---|---|---|---|---|---|---|---|---|
| IS_BONDED_m_PKG[q:0]: | 1 | 0 | 1 | 1 | 0 | 0 | 1 | 0 |

28

GEN_MASK_LUT

| | | | | | | | | |
|---|---|---|---|---|---|---|---|---|
| GEN_MASK_LUT(0) = | 0 | 0 | 0 | 0 | 0 | 0 | 0 | 0 |
| GEN_MASK_LUT(1) = | 0 | 0 | 0 | 0 | 0 | 0 | 1 | 0 |
| GEN_MASK_LUT(2) = | 0 | 0 | 0 | 1 | 0 | 0 | 1 | 0 |
| GEN_MASK_LUT(3) = | 0 | 0 | 1 | 1 | 0 | 0 | 1 | 0 |
| GEN_MASK_LUT(4) = | 1 | 0 | 1 | 1 | 0 | 0 | 1 | 0 |
| GEN_MASK_LUT(5) = | 1 | 0 | 1 | 1 | 0 | 0 | 1 | 0 |
| GEN_MASK_LUT(6) = | 1 | 0 | 1 | 1 | 0 | 0 | 1 | 0 |
| GEN_MASK_LUT(7) = | 1 | 0 | 1 | 1 | 0 | 0 | 1 | 0 |
| GEN_MASK_LUT(8) = | 1 | 0 | 1 | 1 | 0 | 0 | 1 | 0 |

FIG. 6

PACKAGE DEPENDENT SEGMENT TERMINAL REMAPPING FOR DRIVING LIQUID CRYSTAL DISPLAYS

FIELD OF THE DISCLOSURE

This disclosure relates to package dependent segment terminal remapping for driving liquid crystal displays (LCDs).

BACKGROUND

LCDs can be used to display messages or other information. A LCD is composed of several segments, which can be visible or invisible. A segment has two electrodes with liquid crystal between them. The electrodes may be referred to, respectively, as the common terminal (COM) and the segment terminal (SEG), which is connected to a segment driver. See FIG. 1. When a voltage above a specified threshold voltage is applied across the liquid crystal, the segment becomes visible. In general, the LCD is driven by alternating current (AC), because direct current (DC) causes electrophoresis effects in the liquid crystal and can degrade the display.

Some LCD modules have built-in drivers/controllers, which handle the generation of characters or graphics on the glass plate in which the liquid crystal is contained. In other cases, a microcontroller can have a built-in LCD driver, which allows the microcontroller to drive the LCD glass directly, thereby eliminating the need for the driver to be integrated into the LCD module.

A microcontroller with a built-in LCD driver can be implemented, for example, as an integrated circuit (IC) chip that is disposed in a package. Different packages with a variety of different input/output (I/O) pin layouts are available. Terminals on the IC chip need to be electrically connected (e.g., bonded) to the package's I/O pads. However, as a result of bonding constraints, physical segment terminals cannot necessarily be used in continuous order in all packages. As shown in FIG. 2, the microcontroller chip (i.e., a die) can be mounted, for example, in either of two packages, one of which results in there being some segment terminals that are not bonded. One difficulty that can arise is that the distribution of unbonded segment terminals may differ from one chip-package combination to another chip-package combination.

SUMMARY

The present disclosure describes techniques that allow the same microcontroller IC chip to accommodate multiple types of packages, which may have different layouts for the I/O pads such that the distribution of bonded and unbonded segment terminals may differ from one package to the next.

For example, in one aspect, a microcontroller for controlling a LCD is mountable in any one of a plurality of package types. The microcontroller includes a LCD controller to generate logical mapping signals that indirectly code for voltages to be applied to electrodes of a LCD glass, and a driver circuit to drive the electrodes. The microcontroller also includes a remapping unit to receive the logical mapping signals from the LCD controller and to map the logical mapping signals to the driver circuit based on a specified one of the package types.

In some implementations, the remapping unit receives the logical mapping signals from the LCD controller and maps the logical mapping signals, for each of the package types, to physical segment terminal drivers in the driver circuit based on a distribution of I/O terminals that are bonded for each package type when that package type is used with the LCD glass.

According to another aspect, a method of driving LCD segment terminals includes receiving, in a remapping unit, logical mapping signals from a LCD controller, wherein the logical mapping signals indirectly code for voltages to be applied to segment terminals of a LCD glass. The method includes mapping the logical mapping signals to physical segment terminal drivers based on a particular package type in which a microcontroller that includes the LCD controller is disposed, and applying voltages to the segment terminals in accordance with the mapping.

Other aspects, features and advantages will be apparent from the following detailed description, the accompanying drawings, and the claims.

BRIEF DESCRIPTION OF THE DRAWINGS

FIG. 6 illustrates an example of a generation-mask look-up table according to some implementations.

DETAILED DESCRIPTION

Figure 1:
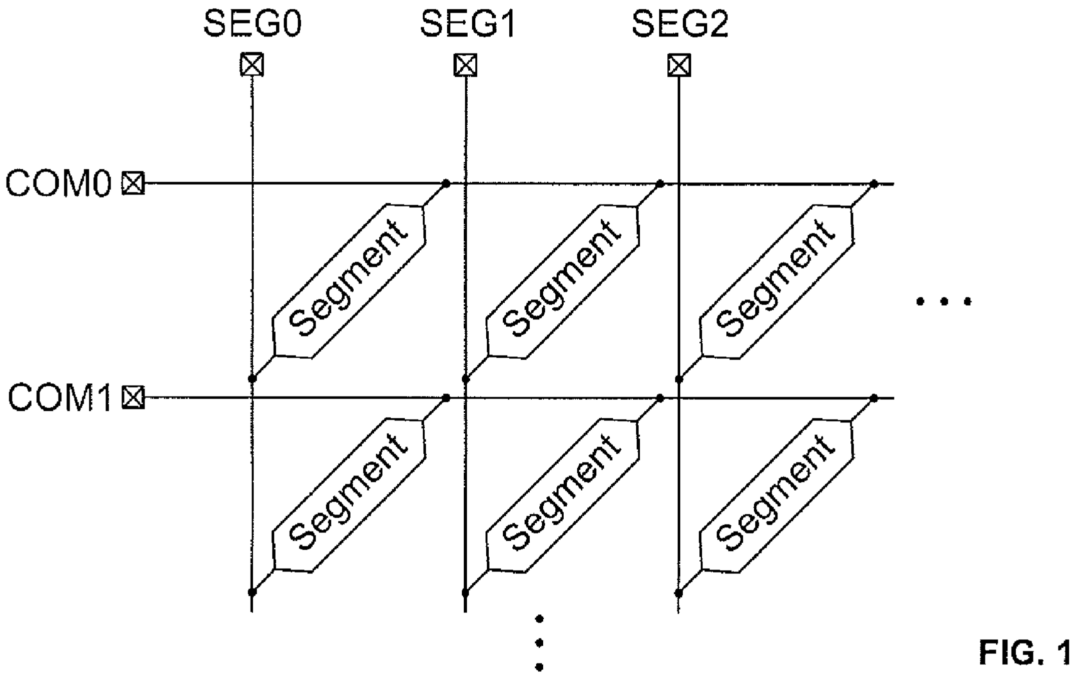
FIG. 1 illustrates a LCD display including multiple segments.
Figure 2:
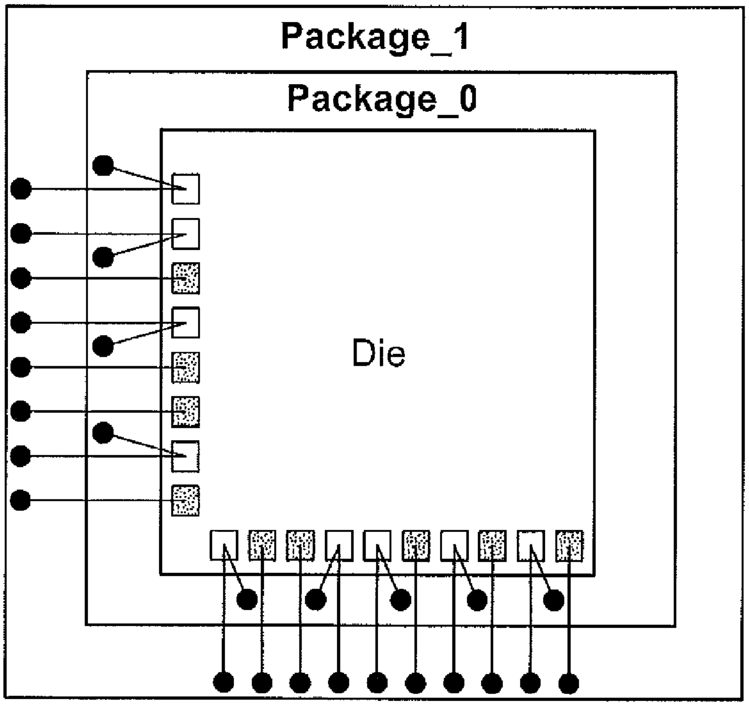
FIG. 2 illustrates an example of how the same microcontroller die is bonded to I/O pads of different packages differently.
Figure 3:
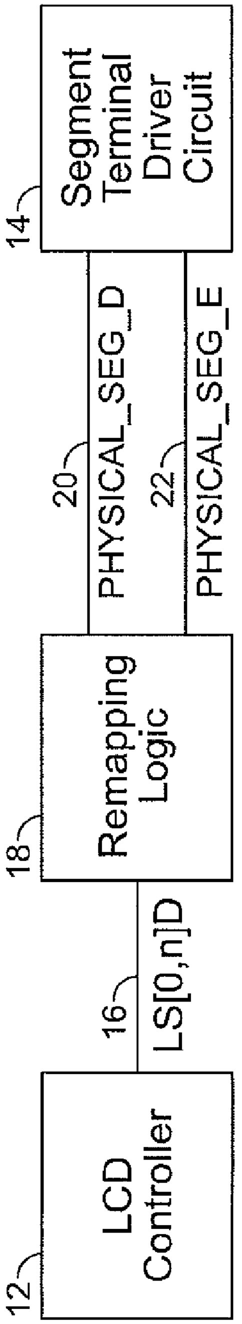
FIG. 3 is a simplified block diagram illustrating a microcontroller including a remapping unit to map logical segments to physical segments.

As shown in FIG. 3, a microcontroller 10, which can be implemented, for example, as an IC chip, includes a digital LCD controller 12 and an analog driver circuit 14 to drive the physical segment terminals, where 'q+1' is the number of physical segment terminals. LCD controller 12 generates logical mapping signals (LS[0,*n*]D) that are provided to a logical segments data bus 16, where 'n+1' is the number of logical segments. In the example discussed below, it is assumed for simplicity that the number ('n+1') of logical segments equals the number ('q+1') of physical segments. In other implementations, however, the number ('n+1') of logical segments may differ from the number ('q+1') of physical segments. For example, in some implementations, the number ('n+1') of logical segments is less than the number ('q+1') of physical segments. This situation can be advantageous, for example, to help reduce the cost of the digital LCD controller 12, which can be resized relatively easily for different chips, without changing the analog block.

The logical mapping signals generated by LCD controller 12 can be based on information stored in the LCD controller display memory and can take the form of digital ones and zeroes, each of which indirectly codes for the next voltage waveform to be applied on a corresponding segment terminal (i.e., to control how the corresponding segment terminal on the LCD glass is energized). For example, a logical '0' or '1' in LCD controller display memory can indicate whether the absolute voltage to be applied to a particular electrode must be greater than a specific threshold that will polarize the LCD segment.

Figure 3A:
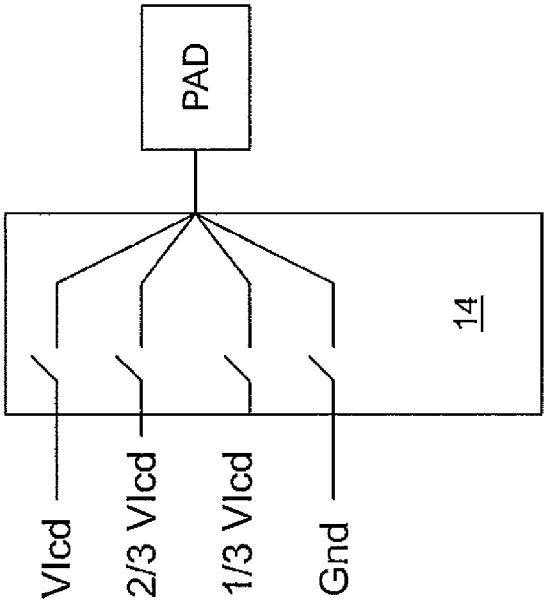
FIG. 3A is an example of a segment terminal driver.

Microcontroller 10 also includes remapping unit 18, which maps the logical mapping signals (LS[0,*n*]D) to the physical segment terminal drivers 14. In particular, remapping unit 18 converts the logical mapping signals (LS[0,*n*]D) to physical segment data (PHYSICAL_SEG_D) that is provided to a physical segment data bus 20, and to enable signals (PHYSICAL_SEG_E) that are provided to an enable bus 22. The signals from remapping unit 18 are provided, respectively, over the buses 20, 22 to segment terminal driver circuit 14, which drives the physical segment terminals. Segment terminal driver circuit 14 includes logic that generates the correct waveforms for the voltages applied to the electrodes using the PHYSICAL_SEG_D and PHYSICAL_SEG_E signals, as well as the previously-applied voltage levels, to ensure that no DC voltage is applied, which could be destructive for the LCD. An example of segment terminal driver 14 is illustrated in FIG. 3A. According to this example, the PHYSICAL_SEG_D bus indirectly selects the voltage source to apply (e.g., Vlcd or a divided source voltage). If the particular segment is not bonded, none of the source voltage switches will be closed, so the multiplexor output will be high impedance. This information can be included in the PHYSICAL_SEG_E vector. Thus, the resistive and capacitive load of the wire connecting the voltage sources to the I/O pad and part of the analog multiplexor are not seen by the voltage sources.

Remapping unit 18 allows independent control of each segment terminal driver. In addition, it allows unused segment terminals (i.e., terminals that are not bonded or not enabled by the user) to be disconnected from the LCD voltage driver, which can facilitate reducing the overall power consumption. Otherwise, driver circuit 14 would see the capacitive load of the physical segment pad, even if it is not bonded, each time the LCD voltage changes.

Figure 4:
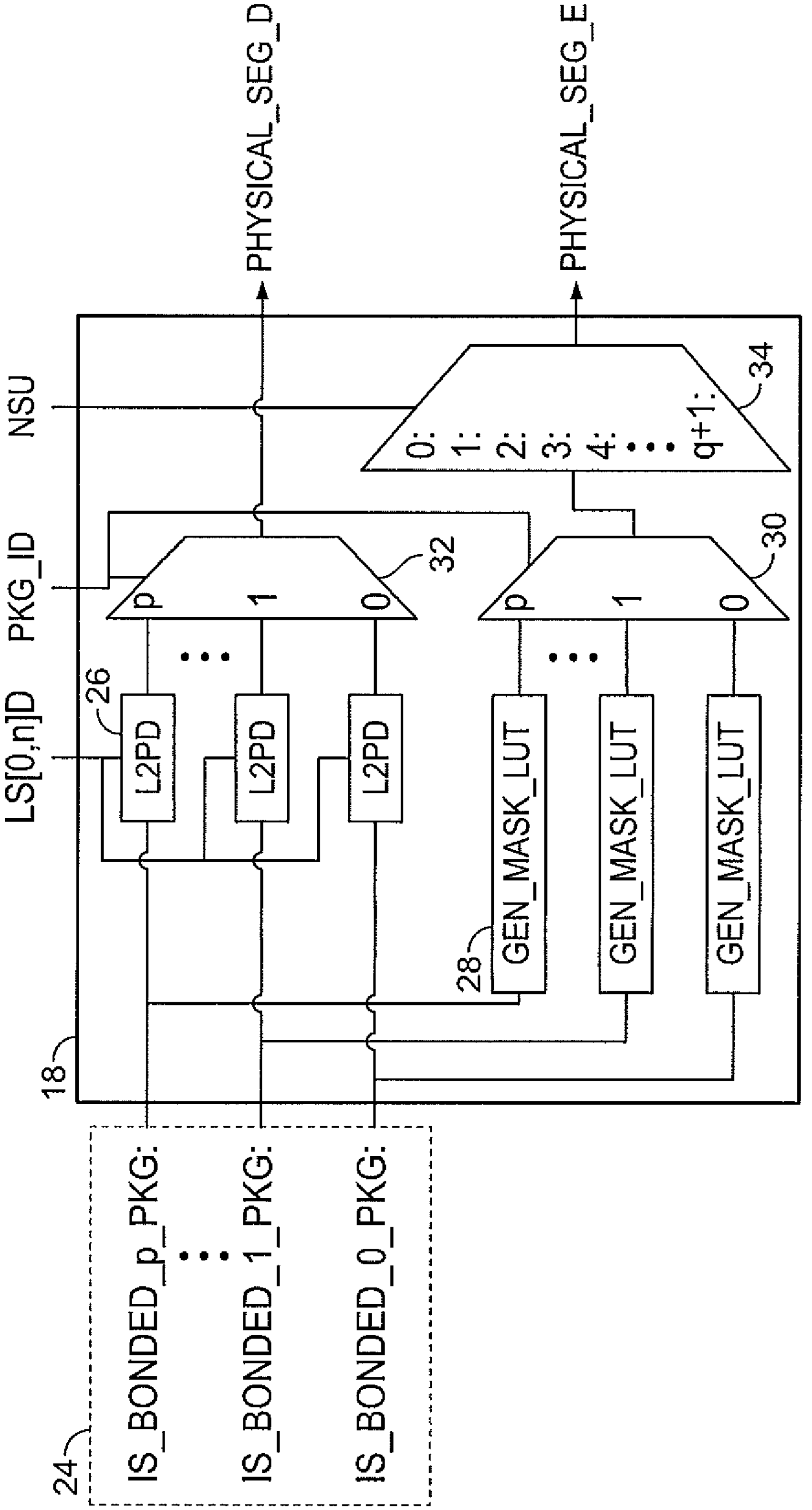
FIG. 4 illustrates further details of the remapping unit according to some implementations.

As illustrated in FIG. 4, remapping logic receives several input signals in addition to the LS[0,*n*]D logical mapping signals. In particular, remapping unit 18 receives a package identifier (PKG_ID), which can be stored, for example, in flash memory in microcontroller 10 and which can be programmed and locked into memory following production testing during chip production. Remapping unit 18 also receives an indication (NSU) of the number of physical segments to be used. The NSU value, which can be programmed by a user depending, for example, on the LCD glass, is stored in a register in microcontroller 10. In the illustrated example, the number of physical segments to be used equals NSU. When NSU is set to zero, no physical segments are to be used.

Figure 5:
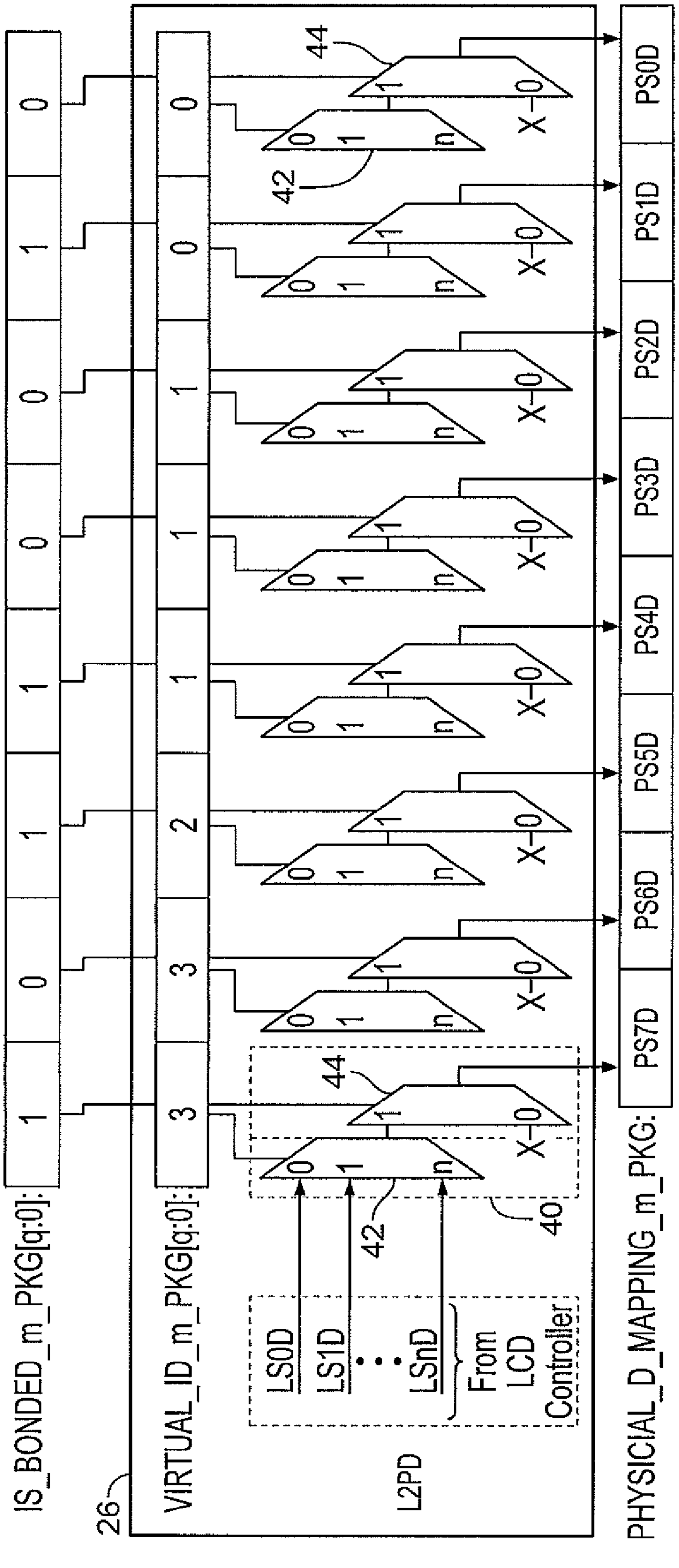
FIG. 5 illustrates further details of a logical-to-physical data mapping unit according to some implementations.

Remapping unit 18 also receives a vector (IS_BONDED_m_PKG, where 'm' identifies the package type), which can be stored in circuitry, shown as table 24. Table 24 stores multiple vectors, each of which describes which segment terminals are used for a particular package type. In the illustrated example, there are 'p+1' types of possible packages, each of which has a corresponding vector in table 24. An example of such a vector (IS_BONDED_m_PKG) is illustrated along the top of FIG. 5. In the illustrated example, the left-most value is the highest bit, and the right-most value is the lowest bit. Thus, the values of the bits (from highest to lowest) in the illustrated IS_BONDED_m_PKG vector in FIG. 5 are (10110010). In the example, it is assumed that there are eight segment terminals. A logical '1' indicates the corresponding segment terminal is to be bonded when the microcontroller chip is connected to the particular package, whereas a logical '0' indicates the corresponding segment terminal will not be bonded when the microcontroller chip is connected to the particular package. The information in table 24 can be stored in circuitry. For example, in some implementations, the information in table 24 is hard-coded using combinatorial logic. In that case, a synthesizer tool can be used to perform logic optimization to reduce the gate count of the LCD controller instance. In some implementations, flip-flops can be used to store the information in table 24 after it is read, for example, from flash memory. In yet other implementations, the information in table 24 is stored in circuitry (e.g., memory) at the time of chip production.

As further shown in FIG. 4, remapping unit 18 includes multiple logical-to-physical data (L2PD) mapping units 26. For each supported package type, a L2PD mapping unit 26 is instantiated. Depending on the value of the package identifier (PKG_ID), the PHYSICAL_SEG_D signals on data bus 20 drive the segment terminals for the selected package configuration. Furthermore, the PHYSICAL_SEG_E signals on enable bus 22 enable only the segment terminals to be used based on the NSU value.

The number of L2PD mapping units 26 corresponds to the number ('p+1') of possible package types. Thus, if table 24 stores information for 'p+1' package types, there should be 'p+1' L2PD mapping units 26, one for each package type. Likewise, remapping unit 18 stores multiple generation-mask look-up tables (GEN_MASK_LUTs) 28. Here too, the number of generation-mask look-up tables 28 should correspond to the number ('p+1') of package types, with one generation-mask look-up table 28 for each different package type stored by table 24. The functions of L2PD mapping units 26 and GEN_MASK_LUTs 28 are described in greater below. In the illustrated example, remapping unit 18 also includes several multiplexers 30, 32, 34, whose functions also are described below.

FIG. 5 illustrates further details of a particular one of the L2PD mapping units 26. As shown in FIG. 5, L2PD mapping unit 26 includes multiple pairs (e.g., pair 40) of cascaded multiplexers 42, 44. There is a respective pair 40 of cascaded multiplexers corresponding to each bit in the IS_BONDED_m_PKG vector that is provided as input to L2PD mapping unit 26. In the illustrated example, since the IS_BONDED_m_PKG vector contains eight bits (i.e., '10110010' in the illustrated example), there are eight pairs 40 cascaded multiplexers 42, 44.

L2PD mapping unit 26 also receives, from LCD controller 12, the 'n+1' logical mapping control signals, LS0D . . . LSnD, to code indirectly for the next voltages to apply on the segment terminals. A first one of the multiplexers 42 in each pair 40 receives all 'n+1' control signals LS0D . . . LSnD, and each first multiplexer 42 allows a selected one of those signals to pass to its output. The manner in which each first multiplexer 42 selects one of the control signals LS0D . . . LSnD is described below. The logical mapping control signal selected by each first multiplexer 42 is provided as an input to the second multiplexer 44 in the same pair 40. The second multiplexer 44 then either allows the signal received from the first multiplexer 42 to pass to its output or allows a second input signal (labeled "X" in FIG. 5) to pass to its output. The manner in which each second multiplexer 44 selects one of the two input signals is described below. Collectively, the respective outputs from the second multiplexers 44 form a vector (PHYSICAL_D_MAPPING_m_PKG), which serves as the output from L2PD mapping unit 26 and is provided to multiplexer 32 in mapping unit 18 (see FIG. 4). In FIG. 5, the bits in the output (PHYSICAL_D_MAPPING_m_PKG) of L2PD mapping unit 26 are labeled (from highest to lowest bit) as follows: PS7D . . . PS0D.

The manner in which each first multiplexer 42 in each pair 40 selects one of the 'n+1' control signals is described next. Each first multiplexer 42 receives a respective parameter value from a vector (VIRTUAL_ID_m_PKG) that is autogenerated based on the IS_BONDED_m_PKG vector (see FIG. 5). The manner in which the VIRTUAL_ID_m_PKG vector is generated is described further below. In the example of FIG. 5, the respective parameter values (from highest to lowest) in the VIRTUAL_ID_m_PKG vector are as follows: 3, 3, 2, 1, 1, 1, 0, 0. First multiplexer 42 in a particular pair 40 allows a particular one of the control signals LS0D . . . LSnD received at its input to pass to its output based on the value of a corresponding parameter in the VIRTUAL_ID_m_PKG vector. Thus, in the illustrated example of FIG. 5, first multiplexer 42 in the left-most pair 40 selects control signal LS3D to pass to its output based on receiving the parameter value '3' from VIRTUAL_ID_m_PKG vector. Likewise, first multiplexer 42 in the right-most pair selects control signal LS0D to pass to its output based on receiving the parameter value '0' from VIRTUAL_ID_m_PKG vector.

Second multiplexer 44 in each pair 40 allows one of its two input signals (i.e., either the signal received from the corresponding first multiplexer 42 in the pair 40 or the signal labeled 'X') to pass to its output based on the value of a corresponding bit in the IS_BONDED_m_PKG vector. In particular, if the corresponding bit of the IS_BONDED_m_PKG vector is '1', then second multiplexer 44 allows the signal received from the corresponding first multiplexer 42 to pass to its output. On the other hand, if the corresponding bit of the IS_BONDED_m_PKG vector is '0', then second multiplexer 44 allows the signal labeled as 'X' to pass to its output. Thus, in the illustrated example of FIG. 5, second multiplexer 42 in the left-most pair 40 selects the signal received from the corresponding first multiplexer 42 to pass to its output (in this case, the signal LS3D). In contrast, second multiplexer 44 in the right-most pair 40 selects the signal labeled 'X' to pass to its output. As noted above, the respective values from the outputs of the second multiplexers 44 are output from L2PD 26 as the PHYSICAL_D_MAPPING_m_PKG vector. In the illustrated example, the values of parameters in the PHYSICAL_D_MAPPING_m_PKG vector (from PS7D to PS0D) are as follows: LS3D, X, LS2D, LS1D, X, X, LS0D, X. Thus, the cascaded multiplexer pairs 40 assign the correct physical segment based on the IS_BONDED_m_PKG vector values and the VIRTUAL_ID_ m_PKG vector values.

If the signal 'X' is allowed to pass to the output of a particular one of the second multiplexers 44, it indicates that the corresponding physical segment terminal is not bonded and is not being used. Thus, the value of the signal labeled 'X' can be assigned arbitrarily or can be assigned to optimize the combinatorial logic.

The manner in which the VIRTUAL_ID_m_PKG vector is generated is described next. The VIRTUAL_ID_m_PKG vector is a 'q+1'-element vector that is automatically generated from the IS_BONDED_m_PKG vector using, for example, combinatorial logic. Starting with lowest bit, the value of each parameter in the VIRTUAL_ID_m_PKG vector equals the number of previous bits in the IS_BONDED_PKG vector that are set to '1'. Thus, in the illustrated example of FIG. 5, each of the third, fourth and fifth bits in the VIRTUAL_ID_m_PKG vector are set to '1' because only a single previous bit in the IS_BONDED_m_PKG vector has the value '1'. On the other hand, the sixth bit in the VIRTUAL_ID_m_PKG vector is set to '2' and the seventh and eighth bits are both set to '3'. In some implementations, the following algorithm is used to generate the values for the VIRTUAL_ID_m_PKG vector:

```
VIRTUAL__ID__m__PKG[0] = 0
If(i>0)
begin
    if(IS__BONDED__m__PKG[i−1] = 1) VIRTUAL__ID__m__PKG[i]=
VIRTUAL__ID__m__PKG[i−1]+1
    else VIRTUAL__ID__m__PKG[i]=VIRTUAL__ID__m__PKG[i−1]
end.
```

As explained above, each L2PD mapping unit 26 generates an output (PHYSICAL_D_MAPPING_m_PKG) based on the control signals (LS[0,*n*]D) from LCD controller 12 and based on an IS_BONDED_m_PKG vector obtained from table 24. The output from each L2PD mapping unit 26 is provided to multiplexer 32 (FIG. 4). Since there are 'p+1' possible package types, and thus 'p+1' L2PD mapping units 26, multiplexer 32 receives 'p+1' PHYSICAL_D_MAPPING_m_PKG vectors, one at each of its 'p+1' inputs. Multiplexer 32 selects a particular one of the PHYSICAL_D_MAPPING_m_PKG vector inputs based on the package identifier (PKG_ID). The information in the selected PHYSICAL_D_MAPPING_m_PKG vector is passed to the physical segment data bus 20 as the physical segment data (PHYSICAL_SEG_D) that is provided to the driver circuit 14. Remapping unit 18 thus remaps the control signals (LS[0,*n*] D), which code for the voltages to be applied on the physical segment terminal drivers, based on the I/O pad layout for the particular package in which the microcontroller die is mounted. This remapping of the logical segments to the physical segments allows LCD controller 12 to handle different types of packages.

This and the following paragraphs describe in greater detail how the PHYSICAL_SEG_E signals at the output of L2PD mapping unit 26 are generated. As explained above, remapping unit 18 includes GEN_MASK_LUTs 28, each of which receives, as input, one of the IS_BONDED_m_PKG vectors from table 24 (see FIG. 4). Based on the IS_BONDED_m_PKG vector, a particular GEN_MASK_LUT 28 generates a respective masked version of the IS_BONDED_m_PKG vector for each possible NSU value (i.e., for each possible number (0 through q+1) of physical segments that are to be used).

As illustrated in the example of FIG. 6, a particular one of the GEN_MASK_LUTs 28 receives, as input, the same IS_BONDED_m_PKG vector that was discussed above in FIG. 5. Each row in the GEN_MASK_LUT 28 corresponds to a masked version of the IS_BONDED_m_PKG vector for a different NSU value. In the illustrated example, it is assumed that there are a total of eight physical segment terminals (i.e., 'q+1'=9). Thus, the programmable value of NSU, which indicates the number of physical segments to be used, has eight possible values.

In FIG. 6, the first row in GEN_MASK_LUT 28 corresponds to NSU=0 (i.e., no physical segment is to be used), whereas the last row corresponds to NSU=8 (i.e., up to a maximum of all the bonded physical segments for the selected package are to be used). For the vector GEN_MASK_LUT(x), there are x bits of value 1, at position(s) defined by the IS_BONDED_m_PKG vector, starting from the least significant bit (i.e., the right-hand side in FIG. 6. Thus, for example, the GEN_MASK_LUT(3) vector has three bits set to the value 1 at positions corresponding to those in the IS_BONDED_m_PKG vector, whereas the GEN_MASK_LUT(4) vector has four bits set to the value 1. On the other hand, if the number of bonded segments is to be less than the NSU value, then GEN_MASK_LUT(y)=GEN_MASK_LUT(y−1). This is the case for the last four rows in the example of FIG. 6. (i.e., GEN_MASK_LUT(5), GEN_MASK_LUT(6), GEN_MASK_LUT(7), and GEN_MASK_LUT(8)). As described below, this technique allows independent control of each segment terminal driver and also allows segment terminals that are unused or are not bonded to be disconnected from the LCD voltage driver. This feature can help reduce overall power consumption in some implementations.

As shown in FIG. 4, for each of the 'p+1' package types, a corresponding GEN_MASK_LUT 28 is generated, and the output of each GEN_MASK_LUT 28 is provided to multiplexer 30 (FIG. 4). As explained below, any one of the rows in a selected one of the GEN_MASK_LUTs 28 can be chosen so as to enable driving of the physical segments based on the particular package and based on the number of physical segments the user has programmed for use. In particular, multiplexer 30 selects the output from a particular one of the GEN_MASK_LUTs 28 based on the package identifier (PKG_ID). The 'q+1' rows of information for the selected GEN_MASK_LUT 28 then are passed to multiplexer 34, which selects a particular row based on the NSU value. The selected row of signals, which represent a masked version of the IS_BONDED_m_PKG vector for the selected package type, is passed to the physical segment enable bus 22 as the physical segment enable signals (PHYSICAL_SEG_E) that are provided to the driver circuit 14. The driver circuit then generates signals to drive the physical segment terminals in accordance with the physical segment data (PHYSICAL_SEG_D) on data bus 20 and in accordance with the physical segment enable signals (PHYSICAL_SEG_E) on the enable bus 22.

Other implementations are within the scope of the claims.

What is claimed is:

1. A microcontroller for controlling a LCD, the microcontroller being mountable in any one of a plurality of package types, the microcontroller comprising:

a LCD controller to generate logical mapping signals that indirectly code for voltages to be applied to electrodes of a LCD glass;

a driver circuit to drive the electrodes;

a remapping unit to receive the logical mapping signals from the LCD controller, wherein, in addition to an input to receive the logical mapping signals from the LCD controller, the remapping unit has inputs to receive, respectively (i) a package identifier indicative of the specified one of the package types, (ii) an indication of the number of LCD segment terminals to be used, and (iii) a vector describing which segment terminals are used for the particular package type, wherein the remapping unit is operable to map the logical mapping signals to the driver circuit, based on information received at each of the inputs, by converting, the logical mapping signals to enable signals and to physical segment data to be provided to the driver circuit.

2. The microcontroller of claim 1 wherein the remapping unit maps the logical mapping signals to the driver circuit based, at least in part, on a distribution of I/O pads that are bonded for the particular package type when used with the LCD glass.

3. The microcontroller of claim 1 including:

circuitry storing a first vector indicative of which LCD segment terminals are bonded for the particular package type, wherein the remapping unit includes a logical-to-physical data mapping unit that maps the logical mapping signals to physical segment terminal drivers in the driver circuit based on the first vector.

4. The microcontroller of claim 3 wherein the logical-to-physical data mapping unit is arranged to convert the first vector to a second vector, wherein each bit position in the second vector specifies a corresponding physical segment terminal identifier, and wherein the logical-to-physical data mapping unit is arranged to remap the logical mapping signals based, at least in part, on the second vector.

5. The microcontroller of claim 4 wherein each bit in the second vector depends on the number of previous bits in the first vector having a value that indicates a corresponding LCD segment terminal is bonded for the particular package type.

6. The microcontroller of claim 5 wherein the logical-to-physical data mapping unit includes a plurality of pairs of selectors, wherein a first selector in each pair allows one of the logical mapping signals to pass to its respective output based on a corresponding bit in the second vector.

7. The microcontroller of claim 3 wherein the remapping unit includes a look-up table that generates output to enable driving selected ones of the LCD segment terminals based on the particular package type and based on the number of LCD segment terminals programmed for use.

8. The microcontroller of claim 7 wherein the look-up table stores a plurality of rows of information each of which is based on the first vector and reflects a different number of the LCD segment terminals programmed for use.

9. The microcontroller of claim 7 wherein the remapping unit further includes a plurality of look-up tables that generate output to enable driving selected ones of the LCD segment terminals based on the particular package type and based on the number of LCD segment terminals programmed for use.

10. The microcontroller of claim 9 wherein the remapping unit includes:

a first selector to select output from a particular one of the logical-to-physical data mapping units based on an identifier for the package type;

a second selector to select output from a particular one of the look-up tables based on the identifier for the package type; and a third selector to select a particular subset of the output from the particular look-up table based on the number of LCD segment terminals programmed for use.

11. The microcontroller of claim 3 wherein the circuitry storing the first vector indicative of which LCD segment terminals are bonded for the particular package type comprises combinatorial logic.

12. The microcontroller of claim 1 including:

circuitry storing first vectors each of which describes which LCD segment terminals are bonded for a respective particular package type, wherein the remapping unit includes a plurality of logical-to-physical data mapping units each of which maps the logical mapping signals to physical segment terminal drivers in the driver circuit based on a respective one of the first vectors.

13. A method of driving LCD segment terminals, the method comprising:

receiving, in a remapping unit, (i) logical mapping signals from a LCD controller, wherein the logical mapping signals indirectly code for voltages to be applied to segment terminals of a LCD glass, (ii) a package identifier indicative of a specified package type, (iii) an indication of the number of LCD segment terminals to be used, and (iv) a vector describing which segment terminals are used for the particular package type;

mapping the logical mapping signals to physical segment terminal drivers based on the information received in the remapping unit; and applying voltages to the segment terminals in accordance with the mapping.

14. The method of claim 13 including mapping the logical mapping signals to the physical segment terminal drivers based, at least in part, on a distribution of I/O pads that are bonded for the particular package type when used with the LCD glass.

15. The method of claim 13 including:

storing a first vector indicative of which LCD segment terminals are bonded for the particular package type, and mapping the logical mapping signals to the physical segment terminal drivers based on the first vector.

16. The method of claim 15 wherein mapping the logical mapping signals to the physical segment terminal drivers based on the first vector includes:

converting the first vector to a second vector, wherein each bit position in the second vector specifies a corresponding physical segment terminal identifier; and remapping the logical mapping signals based, at least in part, on the second vector.

17. The method of claim 16 wherein each bit in the second vector depends on the number of previous bits in the first vector having a value that indicates a corresponding LCD segment terminal is bonded for the particular package type.

18. The method of claim 17 including selecting a particular one of the logical mapping signals as an output based on a corresponding bit in the second vector if a corresponding bit in the first vector has a value indicating that the corresponding LCD segment terminal is bonded for the particular package type.

19. The method of claim 15 including generating output to enable driving selected ones of the LCD segment terminals based on the particular package type and based on the number of LCD segment terminals programmed for use.

20. A microcontroller for controlling a LCD, the microcontroller being mountable in any one of a plurality of package types, the microcontroller comprising:

a LCD controller to generate logical mapping signals indicative of voltages to be applied to segment terminals of a LCD glass;

a driver circuit to drive the segment terminals selectively;

a remapping unit to receive the logical mapping signals from the LCD controller and to map the logical mapping signals, for each of the package types, to physical segment terminal drivers in the driver circuit based on a distribution of I/O terminals that are bonded for each package type when that package type is used with the LCD glass, wherein, in addition to an input to receive the logical mapping signals from the LCD controller, the remapping unit has inputs to receive, respectively (i) a package identifier indicative of the specified one of the package types, (ii) an indication of the number of LCD segment terminals to be used, and (iii) a vector describing which segment terminals are used for the particular package type.

21. The microcontroller of claim 20 including:

circuitry storing information representing first vectors each of which indicates which LCD segment terminals are bonded for a respective one of the package types, wherein the remapping unit includes a plurality of logical-to-physical data mapping units each of which maps the logical mapping signals to the physical segment terminal drivers based on a respective one of the first vectors.

22. The microcontroller of claim 21 wherein the remapping unit further includes a plurality of look-up tables, each of which generates output to enable driving selected ones of the segment terminals based on the particular package type and based on the number of LCD segment terminals programmed for use.

23. The microcontroller of claim 22 wherein the remapping unit further includes:

a first selector to select output from a particular one of the logical-to-physical data mapping units based on an identifier for the package type;

a second selector to select output from a particular one of the look-up tables based on the identifier for the package type; and a third selector to select a particular subset of the output from the particular look-up table based on the number of LCD segment terminals programmed for use.

* * * * *

UNITED STATES PATENT AND TRADEMARK OFFICE

CERTIFICATE OF CORRECTION

PATENT NO. : 8,902,395 B2
APPLICATION NO. : 13/617125
DATED : December 2, 2014
INVENTOR(S) : Sebastien Jouin, Sylvain Garnier and Thierry Delalande It is certified that error appears in the above-identified patent and that said Letters Patent is hereby corrected as shown below:

On the Title Page

Column 1 Item (75) Inventors: Please delete “Sylvan” and insert -- Sylvain --.

In the Drawings

Sheet 4 of 5 (FIG. 5), Line 12 (Approx.) Delete “PHYSICIAL” and insert -- PHYSICAL --, therefor.

Signed and Sealed this
Nineteenth Day of May, 2015

Michelle K. Lee
*Director of the United States Patent and Trademark Office*